United States Patent
Yu et al.

(10) Patent No.: US 10,953,371 B2
(45) Date of Patent: Mar. 23, 2021

(54) THIN FILM COMPOSITES HAVING GRAPHENE OXIDE QUANTUM DOTS

(71) Applicant: University of South Carolina, Columbia, SC (US)

(72) Inventors: Miao Yu, Pittsford, NY (US); Mahdi Fathizadeh, Columbia, SC (US)

(73) Assignee: University of South Carolina, Columbia, SC (US)

( * ) Notice: Subject to any disclaimer, the term of this patent is extended or adjusted under 35 U.S.C. 154(b) by 49 days.

(21) Appl. No.: 15/878,477

(22) Filed: Jan. 24, 2018

(65) Prior Publication Data

US 2018/0207591 A1   Jul. 26, 2018

Related U.S. Application Data

(60) Provisional application No. 62/450,323, filed on Jan. 25, 2017.

(51) Int. Cl.
*B01D 69/14* (2006.01)
*C08J 5/22* (2006.01)
(Continued)

(52) U.S. Cl.
CPC ....... *B01D 69/148* (2013.01); *B01D 67/0006* (2013.01); *B01D 67/0088* (2013.01);
(Continued)

(58) Field of Classification Search
CPC ........... B01D 2325/04; B01D 2325/06; B01D 67/0006; B01D 67/0088; B01D 69/02; B01D 69/10; B01D 69/125; B01D 69/148; B01D 71/021; B01D 71/024; B01D 71/028; B01D 71/56; B01D 71/68; C08J 5/2256; C08J 2379/02; C08K 3/20; C08K 2201/003
See application file for complete search history.

(56) References Cited

U.S. PATENT DOCUMENTS

2014/0311967 A1* 10/2014 Grossman ................ B32B 3/00
                                                        210/500.21
2017/0314141 A1* 11/2017 Xu ............................ B82B 3/00

FOREIGN PATENT DOCUMENTS

CN        103756675 A  *  4/2014
CN        105960276 A  *  9/2016  ......... B01D 67/0069
(Continued)

OTHER PUBLICATIONS

M. Fathizadeh, A. Aroujalian, A. Raisi, Desalin. Water. Treat. 2015, 56, 2284.
(Continued)

*Primary Examiner* — Latosha Hines
(74) *Attorney, Agent, or Firm* — Dority & Manning, P.A.

(57) ABSTRACT

Thin film composite membranes and methods of fabricating thin film composite membranes are disclosed. A thin film composite membrane can include nitrogen-doped graphene oxide quantum dots. The graphene oxide quantum dots can be doped with nitrogen to increase the performance of the thin film composite membrane. Other particulate compounds can be further integrated with the thin film composite membrane including zeolites, titanium oxides, and sulfur oxides. The thin film composite membranes can be used for various applications including desalination.

14 Claims, 11 Drawing Sheets

(51) Int. Cl.
  C08K 3/20     (2006.01)
  B01D 67/00    (2006.01)
  B01D 69/02    (2006.01)
  B01D 69/10    (2006.01)
  B01D 69/12    (2006.01)
  B01D 71/02    (2006.01)
  B01D 71/56    (2006.01)
  B01D 71/68    (2006.01)

(52) U.S. Cl.
  CPC .............. B01D 69/02 (2013.01); B01D 69/10 (2013.01); B01D 69/125 (2013.01); C08J 5/2256 (2013.01); C08K 3/20 (2013.01); B01D 71/021 (2013.01); B01D 71/024 (2013.01); B01D 71/028 (2013.01); B01D 71/56 (2013.01); B01D 71/68 (2013.01); B01D 2325/04 (2013.01); B01D 2325/06 (2013.01); C08J 2379/02 (2013.01); C08K 2201/003 (2013.01)

(56) References Cited

FOREIGN PATENT DOCUMENTS

| KR | 20150143134 A | * | 12/2015 | |
|---|---|---|---|---|
| WO | WO-2016058466 A1 | * | 4/2016 | .............. B82Y 40/00 |
| WO | WO-2018138486 A1 | * | 8/2018 | ........... B01D 69/125 |

OTHER PUBLICATIONS

A. Soroush, J. Barzin, M. Barikani, M. Fathizadeh, "Interfacially polymerized polyamide thin film composite membranes: Preparation, characterization and performance evaluation" Desalination 2012, 287, 310.
M. Fathizadeh, A. Aroujalian, A. Raisi, "Effect of lag time in interfacial polymerization on polyamide composite membrane with different hydrophilic sub layers" Desalination 2012, 284, 32.
J. G. Zhang, Z. W. Xu, W. Mai, C. Y. Min, B. M. Zhou, M. J. Shan, Y. L. Li, C. Y. Yang, Z. Wang, X. M. Qian, "Improved hydrophilicity, permeability, antifouling and mechanical performance of PVDF composite ultrafiltration membranes tailored by oxidized low-dimensional carbon nanomaterials" J. Mater. Chem. A 2013, 1, 3101.
M. Fathizadeh, A. Aroujalian, A. Raisi, "Effect of added NaX nano-zeolite into polyamide as a top thin layer of membrane on water flux and salt rejection in a reverse osmosis process" J. Membrane Sci. 2011, 375, 88.
S. H. Kim, S. Y. Kwak, B. H. Sohn, T. H. Park, "Design of TiO2 nanoparticle self-assembled aromatic polyamide thin-film-composite (TFC) membrane as an approach to solve biofouling problem" J. Membrane Sci. 2003, 211, 157.
S. Y. Lee, H. J. Kim, R. Paiel, S. J. Im, J. H. Kim, B. R. Min, "Silver nanoparticles immobilized on thin film composite polyamide membrane: characterization, nanofiltration, antifouling properties" Polymer. Adv. Tech. 2007, 18, 562.
G. L. Jadav, V. K. Aswal, P. S. Singh, "SANS study to probe nanoparticle dispersion in nanocomposite membranes of aromatic polyamide and functionalized silica nanoparticles" J. Colloid. Interf Sci. 2010, 351, 304.
S. Inukai, R. Cruz-Silva, J. Ortiz-Medina, A. Morelos-Gomez, K. Takeuchi, T. Hayashi, A. Tanioka, T. Araki, S. Tejima, T. Noguchi, M. Terrones, M. Endo, "High-performance multifunctional reverse osmosis membranes obtained by carbon nanotube•polyamide nanocomposite" Sci. Rep. 2015, 5.
J. Yin, G. C. Zhu, B. L. Deng, "Graphene oxide (GO) enhanced polyamide (PA) thin-film nanocomposite (TFN) membrane for water purification" Desalination 2016, 379, 93.
S. Bano, A. Mahmood, S. J. Kim, K. H. Lee, "Graphene oxide modified polyamide nanofiltration membrane with improved flux and antifouling properties" J. Mater. Chem. A 2015, 3, 2065.
M. Safarpour, A. Khataee, V. Vatanpour, "Thin film nanocomposite reverse osmosis membrane modified by reduced grapheneoxide/TiO2 with improved desalination performance" J. Membrane Sci. 2015, 489, 43.
W. S. Hummers, R. E. Offeman, "Preparation of Graphitic Oxide" J. Am. Chem. Soc. 1958, 80, 1339.
J. R. Lomeda, C. D. Doyle, D. V. Kosynkin, W. F. Hwang, J. M. Tour, "Diazonium Functionalization of Surfactant-Wrapped Chemically Converted Graphene Sheets" J. Am. Chem. Soc. 2008, 130, 16201.
W. Choi, J. Choi, J. Bang, J. H. Lee, "Layer-by-Layer Assembly of Graphene Oxide Nanosheets on Polyamide Membranes for Durable Reverse-Osmosis Application." ACS Appl. Mater. Inter. 2013, 5, 12510.
R. K. Joshi, P. Carbone, F. C. Wang, V. G. Kravets, Y. Su, I. V. Grigorieva, H. A. Wu, A. K. Geim, R. R. Nair, "Precise and Ultrafast Molecular Sieving Through Graphene Oxide Membranes" Science 2014, 343, 752.
R. R. Nair, H. A. Wu, P. N. Jayaram, I. V. Grigorieva, A. K. Geim, "Unimpeded Permeation of Water Through Helium-Leak-Tight Graphene-Based Membranes" Science 2012, 335, 442.
H. Li, Z. N. Song, X. J. Zhang, Y. Huang, S. G. Li, Y. T. Mao, H. J. Ploehn, Y. Bao, M. Yu, "Ultrathin, Molecular-Sieving Graphene Oxide Membranes for Selective Hydrogen Separation" Science 2013, 342, 95.
Y. Huang, H. Li, L. Wang, Y. L. Qiao, C. B. Tang, C. I. Jung, Y. M. Yoon, S. G. Li, M. Yu, "Ultrafiltration Membranes with Structure-Optimized Graphene-Oxide Coatings for Antifouling Oil/Water Separation" Adv. Mater. Interfaces. 2015, 2.
X. L. Zhan, G. F. Zhang, X. Chen, R. He, Q. H. Zhang, F. Q. Chen, "Improvement of Antifouling and Antibacterial Properties of Poly(ether sulfone) UF Membrane by Blending with a Multifunctional Comb Copolymer" Ind. Eng. Chem. Res. 2015, 54, 11312.
W. Jang, J. Yun, K. Jeon, H. Byun, "PVdF/graphene oxide hybrid membranes via electrospinning for water treatment applications" Rsc Adv. 2015, 5, 46711.
C. Q. Zhao, X. C. Xu, J. Chen, F. L. Yang, "Optimization of preparation conditions of poly(vinylidene fluoride)/graphene oxide microfiltration membranes by the Taguchi experimental design" Desalination 2014, 334, 17.
S. J. Xia, L. J. Yao, Y. Zhao, N. N. Li, Y. Zheng, "Preparation of graphene oxide modified polyamide thin film composite membranes with improved hydrophilicity for natural organic matter removal" Chem. Eng. J. 2015, 280, 720.
S. G. Kim, D. H. Hyeon, J. H. Chun, B. H. Chun, S. H. Kim, Desalin. Water. Treat. 2013, 51, 6338.
H. R. Chae, J. Lee, C. H. Lee, I. C. Kim, P. K. Park, "Graphene oxide-embedded thin-film composite reverse osmosis membrane with high flux, anti-biofouling, and chlorine resistance" J. Membrane Sci. 2015, 483, 128.
J. Shen, Y. Zhu, X. Yang, C. Li, "Graphene quantum dots: emergent nanolights for bioimaging, sensors, catalysis and photovoltaic devices" Chem. Commun. 2012, 48, 3686.
H. P. Cong, J. F. Chen, S. H. Yu, "Graphene-based macroscopic assemblies and architectures: an emerging material system" Chem. Soc. Rev. 2014, 43, 7295.
M. Nurunnabi, Z. Khatun, K. M. Huh, S. Y. Park, D. Y. Lee, K. J. Cho, Y. K. Lee, "In Vivo Biodistribution and Toxicology of Carboxylated Graphene Quantum Dots" Acs Nano 2013, 7, 6858.
Abstract of C. Y. Wu, C. Wang, T. Han, X. J. Zhou, S. W. Guo, J. Y. Zhang, "Insight into the Cellular Internalization and Cytotoxicity of Graphene Quantum Dots" Adv. Healthc. Mater. 2013, 2, 1613.
Z. Zeng, D. Yu, Z. He, J. Liu, F.-X. Xiao, Y. Zhang, R. Wang, D. Bhattacharyya, T. T. Y. Tan, "Graphene Oxide Quantum Dots Covalently Functionalized PVDF Membrane with Significantly-Enhanced Bactericidal and Antibiofouling Performances" Sci. Rep. 2016, 6.
Y. Zhang, H. Gao, J. J. Niu, B. T. Liu, "Facile synthesis and photoluminescence of graphene oxide quantum dots and their reduction products" New J Chem 2014, 38, 4970.

(56) References Cited

OTHER PUBLICATIONS

S. J. Zhu, J. H. Zhang, C. Y. Qiao, S. J. Tang, Y. F. Li, W. J. Yuan, B. Li, L. Tian, F. Liu, R. Hu, H. N. Gao, H. T. Wei, H. Zhang, H. C. Sun, B. Yang, "Strongly green-photoluminescent graphene quantum dots for bioimaging applications" Chem. Commun. 2011, 47, 6858.

X. L. Li, H. L. Wang, J. T. Robinson, H. Sanchez, G. Diankov, H. J. Dai, "Simultaneous Nitrogen Doping and Reduction of Graphene Oxide" J. Am. Chem. Soc. 2009, 131, 15939.

L. Wang, S. J. Zhu, H. Y. Wang, S. N. Qu, Y. L. Zhang, J. H. Zhang, Q. D. Chen, H. L. Xu, W. Han, B. Yang, H. B. Sun, "Common Origin of Green Luminescence in Carbon Nanodots and Graphene Quantum Dots" Acs Nano 2014, vol. 8, 2541-2547.

Y. Wang, Y. Y. Shao, D. W. Matson, J. H. Li, Y. H. Lin, "Nitrogen-Doped Graphene and Its Application in Electrochemical Biosensing" Acs Nano 2010, 4, 1790.

C. F. Hu, Y. L. Liu, Y. H. Yang, J. H. Cui, Z. R. Huang, Y. L. Wang, L. F. Yang, H. B. Wang, Y. Xiao, J. H. Rong, "One-step preparation of nitrogen-doped graphene quantum dots from oxidized debris of graphene oxide" J Mater Chem B 2013, 1, 39.

B. H. Jeong, E. M. V. Hoek, Y. S. Yan, A. Subramani, X. F. Huang, G. Hurwitz, A. K. Ghosh, A. Jawor, "Interfacial polymerization of thin film nanocomposites: A new concept for reverse osmosis membranes" J. Membrane Sci. 2007, 294, 1.

M. L. Lind, A. K. Ghosh, A. Jawor, X. F. Huang, W. Hou, Y. Yang, E. M. V. Hoek, "Influence of Zeolite Crystal Size on Zeolite-Polyamide Thin Film Nanocomposite Membranes" Langmuir 2009, 25, 10139.

J. M. Arsuaga, A. Sotto, G. Del Rosario, A. Martinez, S. Molina, S. B. Teli, J. De Abajo, "Influence of the type, size, and distribution of metal oxide particles on the properties of nanocomposite ultrafiltration membranes" J. Membrane Sci. 2013, 428, 131.

P. S. Goh, A. F. Ismail, B. C. Ng, "Carbon nanotubes for desalination: Performance evaluation and current hurdles" Desalination 2013, 308, 2.

Abstract of B. Rajaeian, A. Rahimpour, M. O. Tade, S. M. Liu, "Fabrication and characterization of polyamide thin film nanocomposite (TFN) nanofiltration membrane impregnated with TiO2 nanoparticles" Desalination 2013, 313, 176.

Z. Yang, J. Yin, B. L. Deng, "Enhancing water flux of thin-film nanocomposite (TFN) membrane by incorporation of bimodal silica nanoparticles" Aims Environ Sci 2016, 3, 185.

S. Karan, Z. W. Jiang, A. G. Livingston, "Sub-10 nm polyamide nanofilms with ultrafast solvent transport for molecular separation" Science 2015, 348, 1347.

P. G. Ingole, W. K. Choi, I. H. Baek, H. K. Lee, "Highly selective thin film composite hollow fiber membranes for mixed vapor/gas separation" Rsc Adv. 2015, 5, 78950.

A. Kovalchuk, K. W. Huang, C. S. Xiang, A. A. Marti, J. M. Tour, "Luminescent Polymer Composite Films Containing Coal-Derived Graphene Quantum Dots" Acs Appl. Mater. Inter. 2015, 7, 26063.

S. Y. Kwak, S. G. Jung, Y. S. Yoon, D. W. Ihm, "Details of Surface Features in Aromatic Polyamide Reverse Osmosis Membranes Characterized by Scanning Electron and Atomic Force Microscopy" J Polym Sci Pol Phys 1999, 37, 1429.

G. Hurwitz, G. R. Guillen, E. M. V. Hoek, "Probing polyamide membrane surface charge, zeta potential, wettability, and hydrophilicity with contact angle measurements" J. Membrane Sci. 2010, 349, 349.

M. N. Abu Seman, M. Khayet, N. Hilal, "Nanofiltration thin-film composite polyester polyethersulfone-based membranes prepared by interfacial polymerization" J. Membrane Sci. 2010, 348, 109.

* cited by examiner

THIN FILM COMPOSITES HAVING GRAPHENE OXIDE QUANTUM DOTS

CROSS-REFERENCE TO A RELATED APPLICATION

The present application claims priority to U.S. Provisional Patent Application Ser. No. 62/450,323 titled "Polyamide/Nitrogen-Doped Graphene Oxide Quantum Dots (N-GOQD) Thin Film Nanocomposite Reverse Osmosis Membranes for High Flux Desalination" of Yu, et al. filed on Jan. 25, 2017, the disclosure of which is incorporated by reference herein.

STATEMENT OF GOVERNMENT SUPPORT

This invention was made with government support under Grant No. 1451887 awarded by National Science Foundation (NSF). The government has certain rights in the invention.

BACKGROUND

Lack of fresh water resources continues to be a growing concern in the modern world. As a large fraction of available water is in the form of seawater, desalination represents a potential solution for providing fresh water for personal and industrial uses. Owing to its high energy efficiency, reverse osmosis has become a widely applied desalination technology. Moreover, reverse osmosis processes are simple to design and produce high quality fresh water. Thin film composite (TFC) membranes are widely considered to be the best solution for desalination using reverse osmosis. However, TFC membranes still face challenges relating to fouling and degradation from chlorine, which is often used to clean the TFC membranes. These issues result in more frequent membrane replacement, increased energy consumption, and increased production costs. The teachings of the present disclosure seek to improve on the prior art by addressing these challenges.

SUMMARY

Aspects and advantages of embodiments of the present disclosure will be set forth in part in the following description, or may be learned from the description, or may be learned through practice of the embodiments.

Embodiments of the present disclosure include thin film composite membranes and methods of fabricating thin film composite membranes. According to an embodiment of the present disclosure, a thin film composite membrane can include graphene oxide quantum dots. The graphene oxide quantum dots can be doped with nitrogen to increase the performance of the thin film composite membranes. Other particulate compounds can be further integrated with the thin film composite membrane including, for example, zeolites, titanium oxides, and sulfur oxides.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A detailed discussion of embodiments directed to one of ordinary skill in the art is set forth in the specification, which makes reference to the appended figures, in which.

DETAILED DESCRIPTION

Figure 1A:
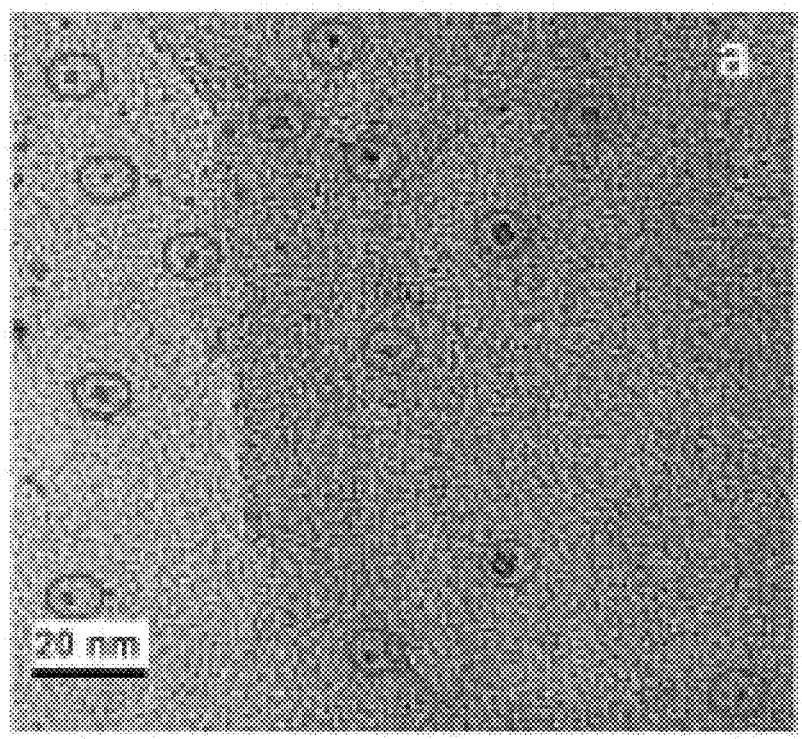
FIG. 1a depicts a transmission electron microscopy (TEM) image of a thin film composite membrane (TFCM) according to an embodiment of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment.

Thus, it is intended that aspects of the present disclosure cover such modifications and variations.

Embodiments of the present disclosure include thin film composite membranes (TFCMs) and methods of fabricating TFCMs. The membrane substrate can take multiple forms including polymer films and fabrics. In one example, the membrane substrate is a polyamide (PA) film. The TFCMs can also include a membrane support that helps provide structure for the membrane substrate. The membrane support can include a polysulfone.

The TFCMs can include graphene oxide in multiple forms. For example, traditional graphene oxide (GO) flakes can be included on the membrane substrate. The GO flakes can have a diameter ranging up to several micrometers. The TFCMs can also incorporate reduced graphene oxide (rGO). Reduced graphene oxide can include a high quantity of functional groups that give beneficial performance properties in desalination and other separation processes. Graphene oxide quantum dots (GOQDs) can also be included in the membrane. The GOQDs can have an average particle diameter ranging from about 1 nm to about 50 nm, such as from about 3 nm to about 30 nm, and such as from about 5 nm to about 20 nm. The GO/rGO/GOQDs can be functionalized to have epoxide, hydroxyl, and carboxylic acid groups and can be synthesized with different sizes and numbers of layers. For example, from about 2 to about 50 monolayers of GO/rGO/GOQDs can be applied on the membrane substrate, such as from about 3 to about 30 monolayers of GO/rGO/GOQDs, such as from about 4 to about 25 monolayers of GO/rGO/GOQDs, and such as from about 5 to about 20 monolayers of GO/rGO/GOQDs. Further, the overall GO/rGO/GOQDs layer thickness can be from about 2 nm to about 80 nm, such as from about 5 nm to about 60 nm, such as from about 10 nm to about 45 nm, and such as from about 15 nm to about 35 nm.

The TFCMs can further include nitrogen-doped graphene oxide quantum dots (N-GOQDs). FIG. 1a depicts N-GOQDs according to the present disclosure, wherein the N-GOQDs are circled. The N-GOQDs can have an average particle size diameter ranging from about 1 nm to about 30 nm, such as from about 2 nm to about 20 nm, and such as from about 3 nm to about 8 nm. The N-GOQDs can have specific functional groups and molecular bonds that are particularly beneficial for producing TFCMs. For example, the N-GOQDs can include carbon-carbon double bonds, carbon-nitrogen bonds, and carbon-oxygen bonds. The N-GOQDs functional groups can include hydroxyl groups, epoxide groups, and carboxyl groups. The composition of the N-GOQDs can be represented by atomic ratios as measured by X-ray photoelectron spectroscopy (XPS). For example, the atomic ratio of nitrogen to carbon (N/C) can be from about 0.2 to about 0.6, such as from about 0.3 to about 0.5, and such as from about 0.38 to about 0.48. The ratio of oxygen to carbon (O/C) can be from about 0.7 to about 1.1, such as from about 0.75 to about 1.0, and such as from about 0.82 to about 0.92. The ratio of hydrogen to carbon (H/C) can be from about 0.03 to about 0.40, such as from about 0.07 to about 0.30, and such as from about 0.10 to about 0.20. The TFCMs can further include various other particulates. For example, the TFCMs can incorporate zeolites, titanium oxides, sulfur oxides such as sulfur dioxide, carbon nanotubes, and functionalized carbon nanotubes.

The surface roughness of the TFCMs can also be controlled. For example, measuring the root mean square (Rms) surface roughness by atomic force microscopy (AFM), the TFCMs can have a surface roughness of from about 50 nm to about 120 nm, from about 60 nm to about 100 nm, and from about 70 nm to about 90 nm, where such high surface roughness levels results in an increased effective water permeation area and thus increased water permeability.

As an important measure of hydrophilicity, the water contact angle of the TFCMs can be controlled. For example, the water contact angle can range from about 50° to about 90°, such as and from about 60° to about 80°. Particularly beneficial results can be found when the water contact angle is from about 52° to about 75°, and more particularly from about 53° to about 61°.

Embodiments of the present disclosure also include methods of fabricating TFCMs, and particularly TFCMs having N-GOQDs. According to an embodiment, a method for producing thin film composite membranes (TFCMs) can include applying nitrogen-doped graphene oxide quantum dots (N-GOQDs) to a substrate. The membrane substrate can take multiple forms including polymer films and fabrics. In one example, the membrane substrate is a polyamide (PA) film.

Embodiments of the present disclosure can have increased effective surface area as measured by atomic force microscopy (AFM). The increased surface area can be defined by an effective surface ratio, which is the actual surface area divided by the two-dimensional surface area of the membrane. Specifically, embodiments can have an effective surface area ratio of from about 1.4 to 3.0, such as from about 2.0 to about 2.9, and such as from about 2.5 to about 2.8.

Embodiments can be fabricated using interfacial polymerization (IP). The interfacial polymerization process can be accomplished in various ways. To begin, N-GOQDs can be produced by mixing GOQDs with citric acid and ammonia, followed by heating the mixture. The N-GOQDs, citric acid, and ammonia can then be filtered (e.g. using a dialysis membrane), centrifuged, and the supernatant collected. These process steps can eliminate or reduce agglomerates and assist in controlling the size of the N-GOQDs that are deposited on the membrane substrate.

The substrate membrane can be placed on a physical support (e.g., a glass support) and prepared prior to applying the N-GOQDs. For example, the substrate membrane can be placed on a support (e.g., a glass support) and submerged in an m-phenylenediamine (MPD) aqueous solution. Excess MPD solution can be removed from the substrate. The substrate membrane can then be soaked in soaked in a 0.1 w/v % of trimesoyl chloride (TMC) in hexane solution. The substrate membranes can then be washed with hexane to remove unreacted monomers. The resulting membrane can be cured with heat at a temperature of, for example, 60° C.

To apply the N-GOQDs, the substrate membrane can be placed in an aqueous solution that includes m-phenylenediamine (MPD) and N-GOQDs. The MPD concentration can range from about 0.1 wt/v % to about 5 wt/v %, such as from about 1.0 wt/v % to about 3.5 wt/v %, and such as from about 1.5 wt/v % to about 2.5 wt/v %. The concentration of N-GOQDs can also be controlled and is important in determining the concentration of N-GOQDs on the substrate as well as the performance of the TFCM. For example, the N-GOQD concentration of the aqueous solution can be from about 0.001 wt/v % to about 0.2 wt/v %, such as from about 0.003 wt/v % to about 0.1 wt/v %, such as from about 0.005 wt/v % to about 0.07 wt/v %, such as from about 0.01 wt/v % to about 0.06 wt/v %, and such as from about 0.015 wt/v % to about 0.05 wt/v %.

The thin film nanocomposite (TFN) membranes using polyamides can be prepared by adding inorganic nanoparticles, such as zeolites, titanium dioxide, silicon dioxide, functionalized carbon nanotubes, graphene oxide (GO), and reduced GO (rGO), into a polyamide (PA) matrix during interfacial polymerization (IP). These nanoparticles can facilitate water transport and thus enhance water flux, and also improve fouling and chlorine resistance. The nanoparticles can be dispersed in either an aqueous or organic phase, and subsequently participate in IP to form thin film nanocomposite (TFN) membranes. Excellent dispersion of nanoparticles, therefore, is a crucial step in generating high quality TFN membranes.

Graphene oxide is an oxidized form of graphene that is made of carbon atoms bonded in a hexagonal honeycomb lattice. Due to the strong oxidation conditions during its synthesis, a large number of oxygen-containing groups, including epoxide, hydroxyl, and carboxylic acid groups, can exist on GO. These functional groups lead to good hydrophilicity and allow for excellent dispersion of GO flakes in water. Therefore, GO flakes can be deposited as ultrathin membranes with lamellar structure or can be incorporated into various polymeric membranes for water purification ranging from microfiltration, ultrafiltration to nanofiltration. Graphene oxide can also be good candidate for making TFN PA membranes for reverse osmosis (RO) desalination, as GO nanoparticles are capable of improved water flux and chlorine resistance. GO flakes on a membrane have also been shown to increase water flux and improve organic fouling resistance during organic separation. Adding GO to PA also allows for increased water permeance and improved anti-bacterial properties by decreasing the amount of cells that attach to the membrane surface. However, the typical diameter of GO flakes is in the range of several hundred nanometers, often greater than the thickness of the substrate membranes. GO with much smaller diameters, therefore, can produce more favorable results when added to TFN membranes and further improve desalination performance.

Graphene oxide quantum dots (GOQD), with a diameter in the range of 3-20 nm can have anti-bacterial tendencies due to their unique properties, such as morphology, ultrasmall lateral size (or diameter), and cytotoxicity. GOQD can therefore replace or supplement GO in TFN membranes. Further, the hydrophilicity of TFN membranes can be significantly improved and the water contact angle dramatically decreased. Embodiments can also include nitrogen-doped GOQD (N-GOQD) as an additive to TFCMs by taking advantage of N-GOQDs size and terminal amine groups that can chemically bond with substrate membranes, especially PA membranes. TFCMs with N-GOQDs have demonstrated higher thermal stability, improved hydrophilicity, and higher effective surface area.

Figure 5:
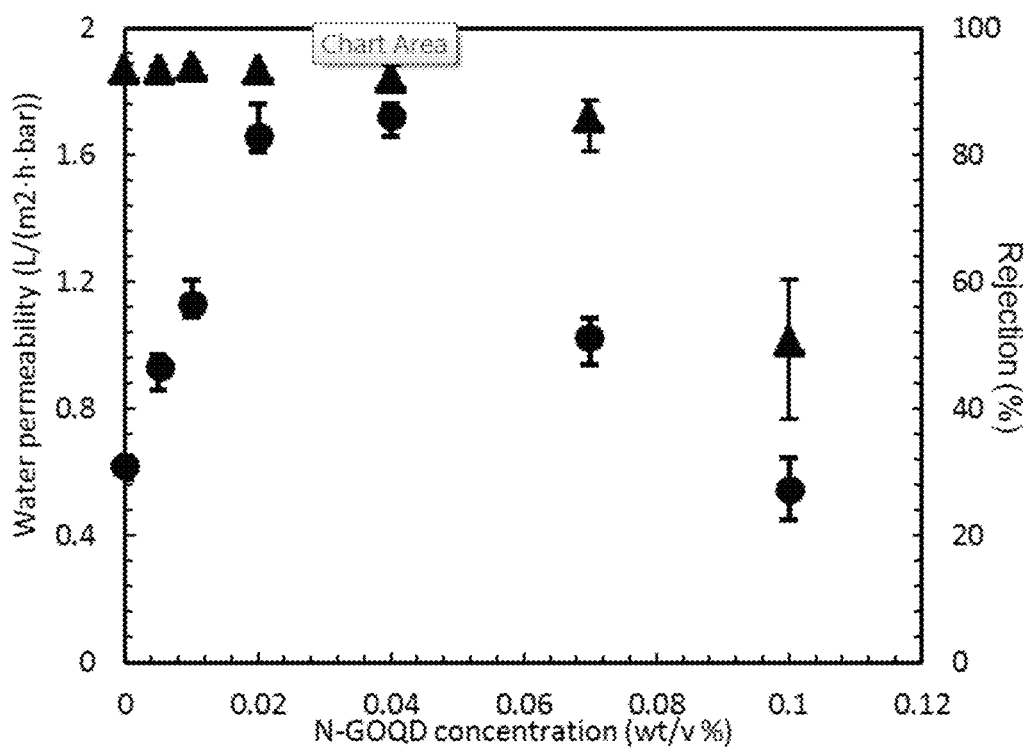
FIG. 5 depicts water flux and sodium chloride rejection measurements of various embodiments of the present disclosure (2000 ppm NaCl, 15 bar; the circles represent water permeability and the triangles represent rejection %)

Thin film composite membrane (TFCM) embodiments of the present disclosure can be particularly useful for desalination. Surprisingly, TFCMs prepared using aqueous solutions having N-GOQD concentrations showed an optimum range of from 0.015 wt/v % to about 0.050 wt/v %. As can be seen in FIG. 5, water permeability increased as the N-GOQD concentrations approached 0.040 wt/v % and then decreased with N-GOQD concentrations greater than 0.050 wt/v %. The results can also be seen in Table 1.

TABLE 1

Water flux and NaCl rejection of PA and N-GOQD/PA membranes (2000 ppm NaCl, 15 bar)

| N-GOQD concentration, wt/v % | Water Permeability, L/($m^2 \cdot h \cdot bar$) | Rejection, % |
| --- | --- | --- |
| 0 | 0.62 | 93.1 |
| 0.005 | 0.93 | 92.9 |
| 0.01 | 1.13 | 93.5 |
| 0.02 | 1.66 | 92.7 |
| 0.04 | 1.72 | 91.5 |
| 0.07 | 1.02 | 85.4 |
| 0.1 | 0.55 | 49.9 |

Thin film composite membranes (TFCMs) were fabricated and analyzed as discussed in the following Examples. Trimesoyl chloride (TMC) (98%), m-phenylenediamine (MPD) (flakes, 99%), n-hexane (laboratory reagent, ≥95%), dichloromethane (anhydrous, ≥99.8%, 40-150 ppm amylene as stabilizer), citric acid (99%), ammonia (28.0-30.0% $NH_3$ solution), and sodium chloride (NaCl, >99%) were purchased from SIGMA ALDRICH and used without further purification. Polysulfone (PS) ultrafiltration membrane (P35, NANOSTONE CO., Minnesota, USA) was used as the support for polyamide (PA) and polyamide nitrogen-dope graphene oxide thin-film nanocomposite (PA/N-GOQD TFN) membranes.

Membranes of the present disclosure can be particularly advantageous for use in desalination. Specifically, membranes of the present disclosure can have increased water permeability as well as increased salt rejection. For example, using a 2000 ppm NaCl solution with a 15 bar pressure drop, membranes of the present disclosure can have water permeability of from about 0.4 to about 2.0 L/($m^2 \cdot h \cdot bar$), such as from about 1.0 to about 1.95 L/($m^2 \cdot h \cdot bar$), such as from about 1.5 to about 1.9 L/($m^2 \cdot h \cdot bar$), and such as from about 1.6 to about 1.8 L/($m^2 \cdot h \cdot bar$). The NaCl rejection rate under the same conditions can range from about 80% to about 98%, such as from about 85% to about 95%.

Example 1

Nitrogen-doped graphene oxide quantum dots (N-GOQDs) were synthesized by carbonization of citric acid with ammonia through hydrothermal treatment. In summary, 80 mL of citric acid aqueous solution (100 mg/mL) and 20 mL of ammonia aqueous solution were transferred into a Teflon-lined autoclave and heated at 180° C. for 24 h. The light yellow resulting solution was dialyzed using a dialysis tubing (3000 Da, SPECTRUM LAB, INC.) and soaked in deionized (DI) water for 4 h to remove impurities and excess ammonia. After dialysis, the aqueous dispersion was centrifuged at 10,000 rpm to remove agglomerates. The supernatant was collected for subsequent membrane preparation, as described below.

Polyamide (PA) membrane was prepared via interfacial polymerization (IP) on a polysulfone (PS) support. The PS support was taped on a glass plate and immersed in a 2.0 w/v % MPD aqueous solution for 2 min. Excess aqueous MPD solution was removed from the PS support surface using a soft rubber roller. Then, the saturated PS support was soaked in a 0.1 w/v % of TMC in n-hexane solution for 1 minute. The resulting membrane was washed with hexane to remove unreacted monomers, cured at 60° C. for 6 min, and then stored in lightproof water bath. To prepare PA TFN membranes, MPD aqueous solution was replaced by an aqueous solution of MPD and N-GOQDs, and the membrane preparation procedure was the same as described above. N-GOQD aqueous solutions with different concentrations were prepared by ultra-sonication, and mixed with MPD aqueous solution to obtain the final solution with an MPD concentration of 2.0 w/v % and an N-GOQD concentration ranging from 0 to 0.1 w/v % (See Table 2, below).

Example 2

X-ray photoelectron spectroscopy (XPS) (KRATOS AXIS ULTRA DLD instrument equipped with a monochromated Al Kα X-ray source and hemispherical analyzer capable of an energy resolution of 0.5 eV) and X-ray diffraction (XRD) (RIGAKU D/Max 2100 Powder X-ray Diffractometer (Cu Kα radiation)) measurements were conducted to characterize the elemental composition and structure of N-GOQD nanoparticles. The functional groups of the membrane surface and N-GOQD nanoparticles were measured by Fourier transform infrared (FTIR) measurements in attenuated total reflection (ATR) mode (THERMO SCIENTIFIC, Waltham, Mass., USA) with 4 $cm^{-1}$ resolution over a wave number range of 600-4,000 $cm^{-1}$.

A field emission scanning electron microscope (FESEM) (ZEISS ULTRA PLUS) was used to observe the membrane morphology. Particle size and distribution of N-GOQDs was observed with transmission electron microscopy (TEM, JEM-2100F, JEOL Ltd. Japan). Moreover, atomic force microscopy (AFM) (TT-AFM, AFM workshop Co., CA, USA) was employed to analyze the surface roughness in root mean square (RMS) as well as the relative surface area of the fabricated PA layer. AFM images were taken over a membrane area of 5×5 $\mu m^2$. The contact angle of water was measured by a VCP OPTIMA system (OPTIMA XE) to compare the hydrophilicity of the fabricated membranes. Water droplets (~1 μL) were placed carefully onto the pristine PA and PA TFN membrane surfaces for imaging. All membrane samples were dried at ambient temperature prior to characterization.

TABLE 2

Concentrations of MPD, TMC and N-GOQD in IP for preparation of TFCMs

| Sample name | TMC (wt/v %) | MPD (wt/v %) | N-GOQD (wt/v %) |
| --- | --- | --- | --- |
| PA | 0.1 | 2 | 0 |
| PA0025 | 0.1 | 2 | 0.0025 |
| PA005 | 0.1 | 2 | 0.005 |
| PA01 | 0.1 | 2 | 0.01 |
| PA02 | 0.1 | 2 | 0.02 |
| PA04 | 0.1 | 2 | 0.04 |
| PA07 | 0.1 | 2 | 0.07 |
| PA10 | 0.1 | 2 | 0.1 |

Thermal gravimetric analysis (TGA) measurements were performed to investigate the thermal stability before and after adding N-GOQDs to the PA membranes. To specifically study the thermal properties of the PA membrane and the PA membrane with N-GOQDs, a PS support with PA and PA with N-GOQDs was firstly separated from the bottom nonwoven polyester. Then, the PS support was dissolved in dichloromethane solution, and PA or PA with N-GOQDs was collected from solution. Finally, TGA measurements were carried out under a nitrogen atmosphere using PERKIN-ELMER thermos-gravimeter (DIAMOND TG/DTA). The flow rate of nitrogen was 20 ml/min, and the heating rate was 10° C./min from 25 to 700° C.

Example 3

Figure 6:
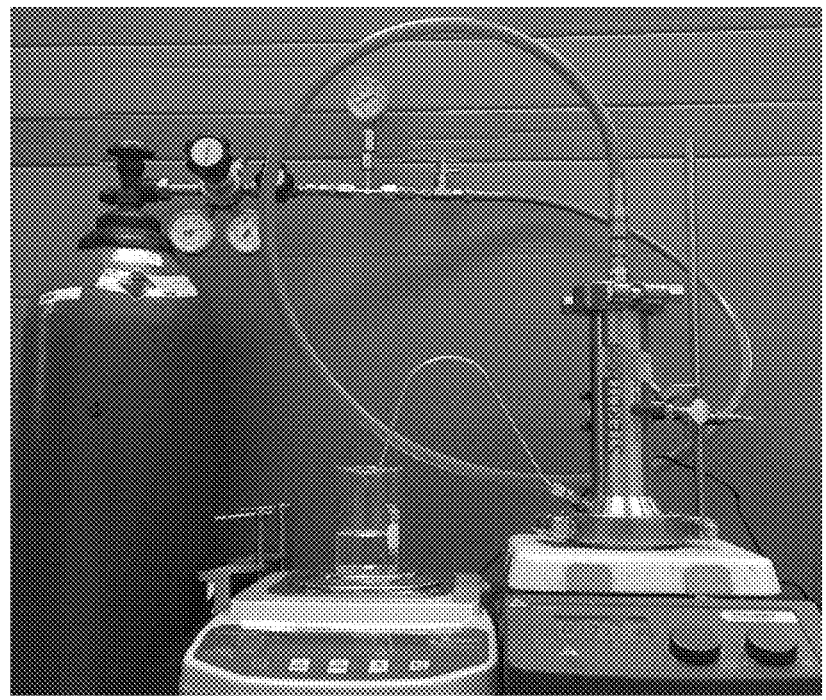
FIG. 6 depicts experimental equipment used in testing embodiments of the present disclosure.

Membrane permeation measurements were conducted using the equipment shown in FIG. 6. A stainless-steel dead-end module with an effective permeation area of 5.1 $cm^2$ was used for salt water permeation measurements. The feed side was connected to a high-pressure nitrogen tank to generate a driving force of approximately 15 bar. Desalination performance of PA and PA TFN membranes were evaluated using 2,000 ppm NaCl solution at room temperature. An electronic scale (OHAUS, CS Series) was used to measure the mass of permeate over time (>3 h), which was used to calculate the volumetric water permeance (J) at steady state. The salt rejection ($R=1-C_p/C_f$, where $C_p$ and $C_f$ are the salt concentration of permeate and feed, respectively) was calculated from the feed and permeate salt concentration. The concentration of NaCl was measured by a conductivity meter (POUR GRAINGER INTERNATIONAL, Lake Forest, Ill., USA).

Example 4

Figure 7A:
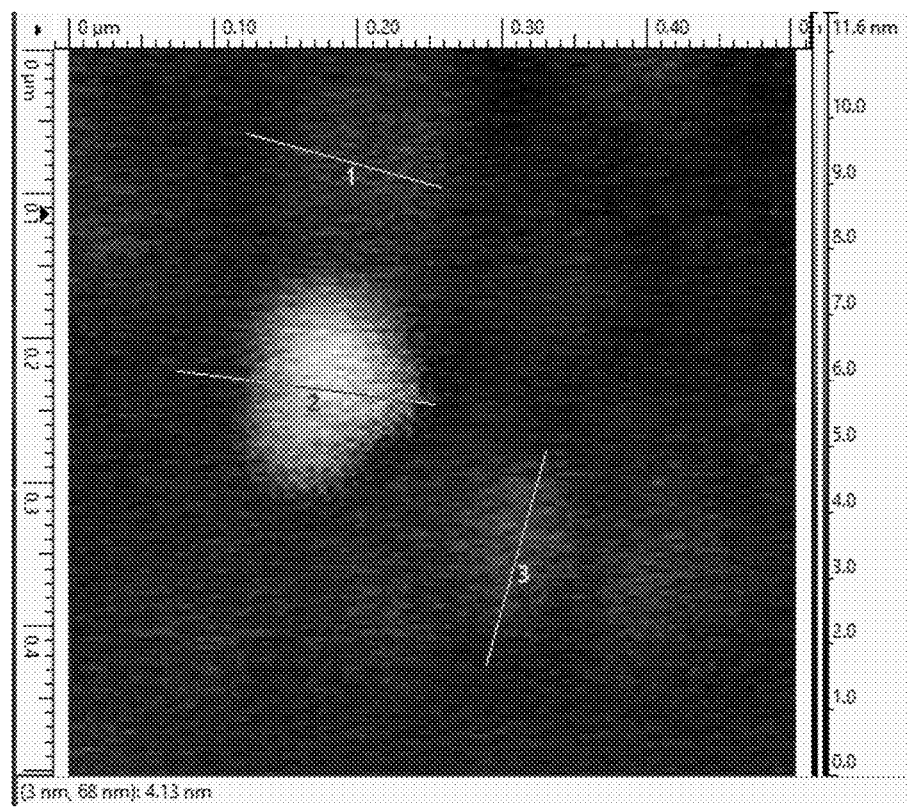
FIG. 7a depicts an atomic force microscopy (AFM) image of an embodiment of the present disclosure.
Figure 7B:
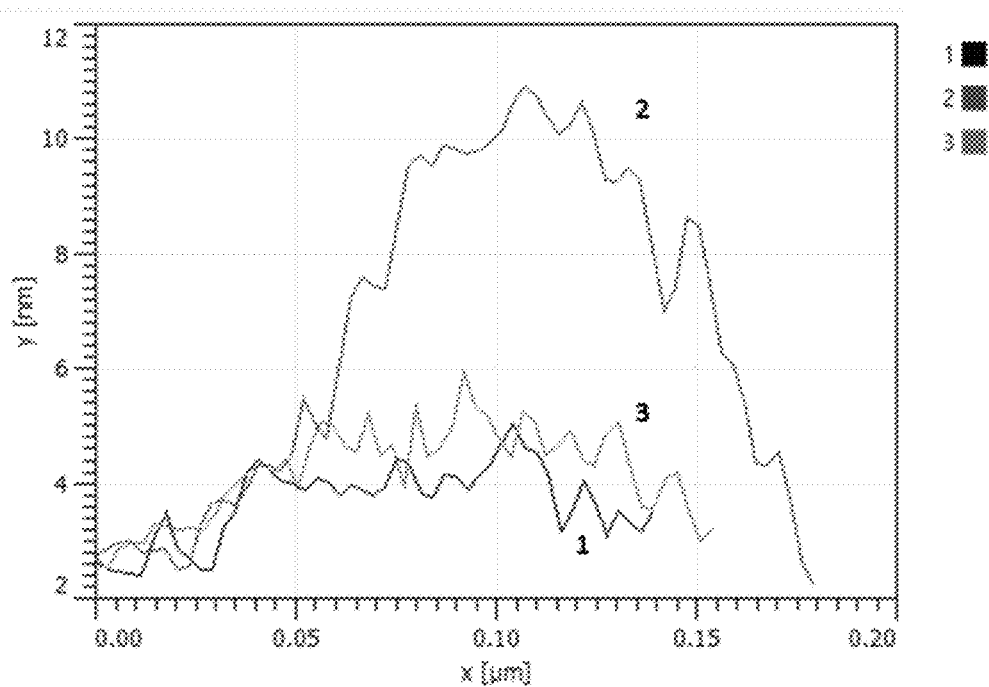
FIG. 7b depicts a height profile graph of individual and agglomerated nitrogen-doped graphene oxide quantum dots (N-GOQDs) in an embodiment of the present disclosure.

FIG. 1a depicts a Transmission Electron Microscopy (TEM) image of a thin film composite membrane (TFCM) according to an embodiment of the present disclosure. FIG. 1a shows that the synthesized N-GOQDs had a relatively uniform size distribution between 3 and 8 nm and were fully dispersed without significant agglomeration. This is consistent with a finding that N-GOQD particles do not react easily with each other and are stable in water at room temperature. In addition, most of the N-GOQD particles only had a few nitrogen-functionalized GO layers (from approximately 3 to 5 layers). The AFM image and height profile of N-GOQD nanoparticles (FIGS. 7a and 7b) confirmed that the synthesized N-GOQD particles have 1 to 5 GO layers. In FIGS. 7a and 7b, lines 1 and 3 illustrate individual N-GOQDs while line 2 illustrates an agglomeration of N-GOQDs.

Figure 1B:
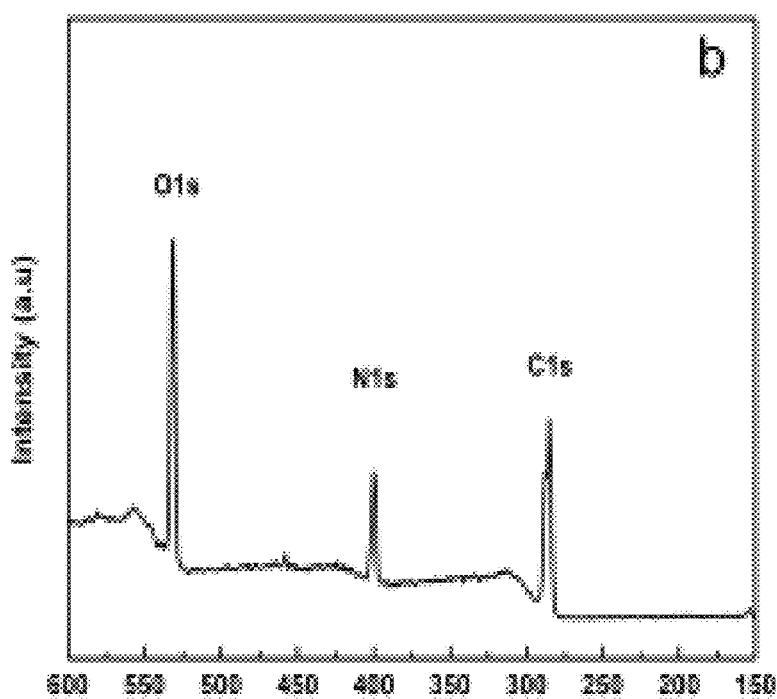
FIG. 1b depicts an X-ray photoelectron spectroscopy (XPS) graph of a TFCM according to an embodiment of the present disclosure.
Figure 8A:
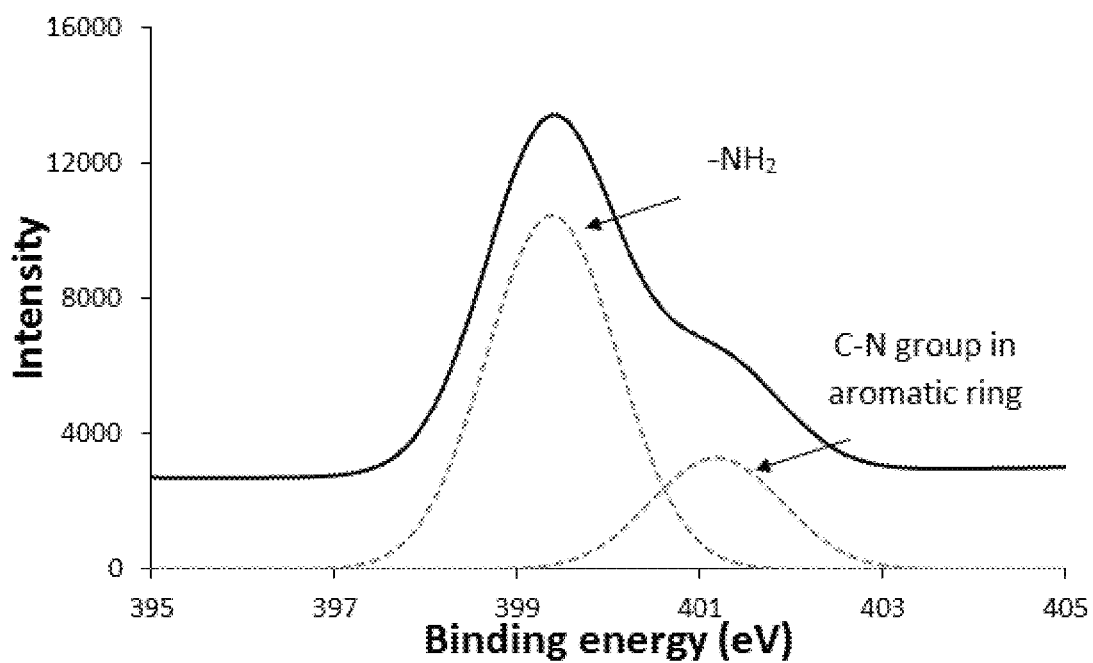
FIG. 8a depicts a graph of intensity versus binding energy as determined by x-ray photoelectron spectroscopy (XPS) deconvolution.

The N-GOQDs showed carbon, oxygen and nitrogen signals at 283 to 290 eV, 530 to 533 eV and 398 to 402 eV in the XPS survey spectrum (FIG. 1b). The N1s XPS spectrum of N-GOQDs can be fitted into two peaks (398 and 401 eV), which can be assigned to pyridinic groups at lower energy and amine or pyrrolic groups at higher energy. FIG. 1b indicates that N1s peak appeared at around 398-402 eV, confirming the amine and pyridine groups of N-GOQDs. Deconvolution of N1s peaks (FIG. 8a) revealed the signals of —$NH_2$ at 399.6 eV and N—C at 401.3 eV. Oxygen-containing groups generally contain several XPS spectrum peaks at 531.2 eV, 532.8 eV, and 535.4 eV for carboxylic acid, epoxy, and hydroxyl groups, respectively.

Figure 8B:
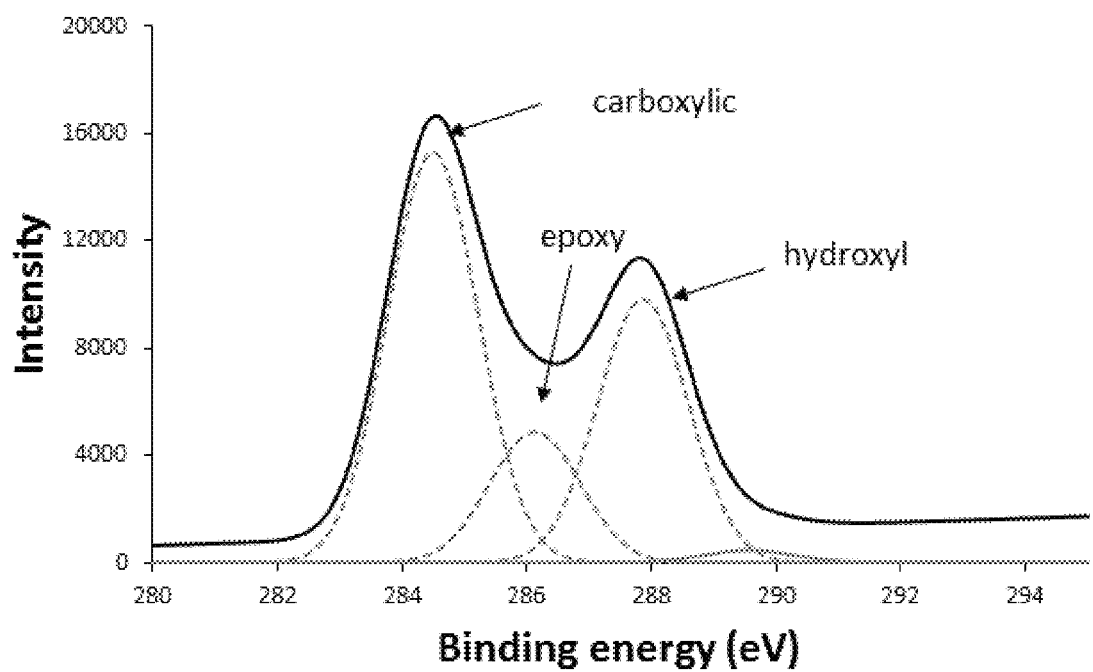
FIG. 8b depicts a graph of intensity versus binding energy as determined by x-ray photoelectron spectroscopy (XPS) deconvolution.

As peak at around 531 eV suggests that N-GOQD also has acid groups that may react with TMC and MPD during an IP reaction. FIG. 8b shows that N-GOQDs had binding energy peaks at 284.6 eV, 286.4 eV, 289.6 eV, and 289.5 eV, attributing to C=C bonds, C—N bonds, C—O bonds (hydroxyl and epoxy), and O=C—OH bonds (carboxyl), respectively. The calculated ratios of N/C, O/C, and H/C from XPS spectrum are 0.43, 0.87, and 0.14, respectively.

Figure 1C:
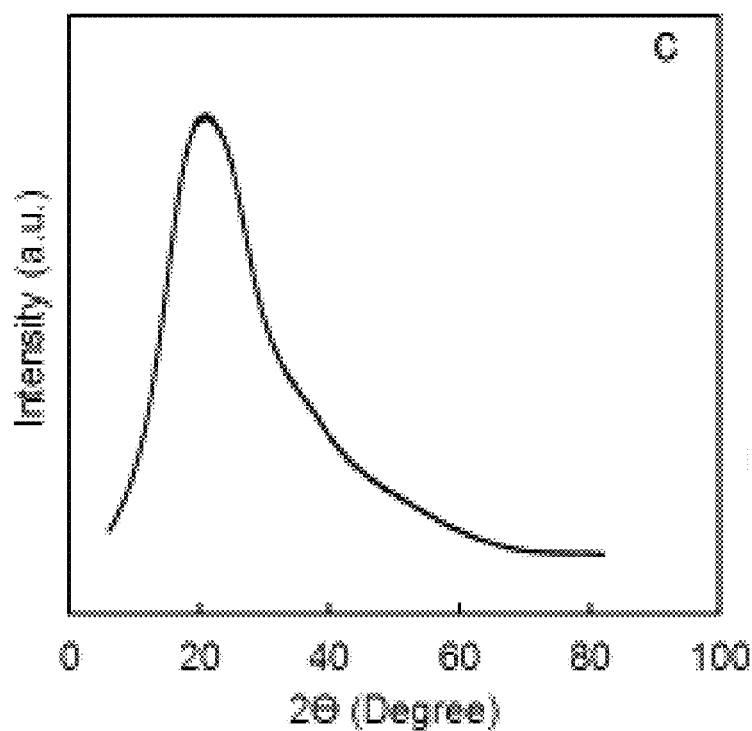
FIG. 1c depicts X-ray diffraction (XRD) measurements of a TFCM according to an embodiment of the present disclosure.
Figure 1D:
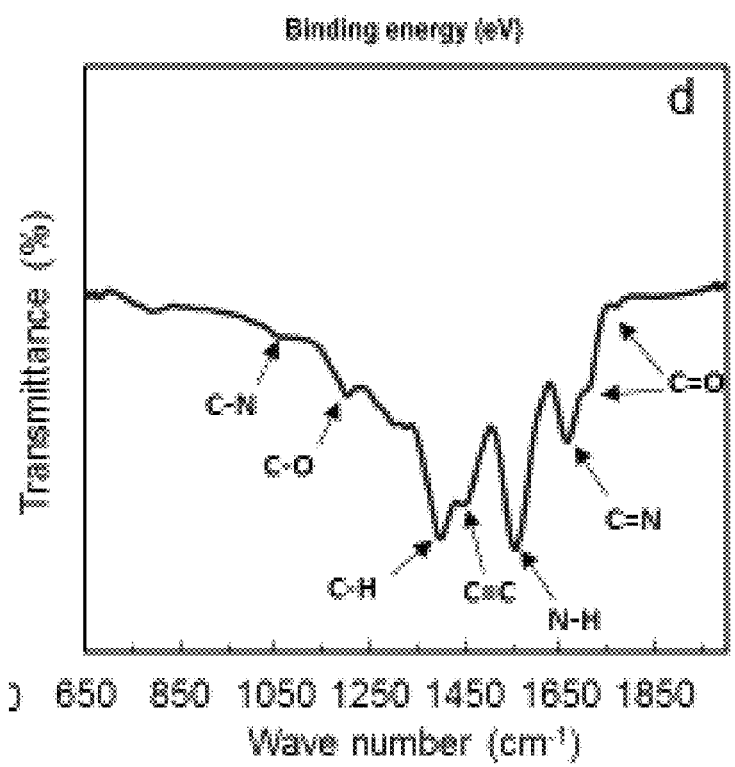
FIG. 1d depicts Fourier transform infrared (FTIR) measurements of a TFCM according to an embodiment of the present disclosure.

As observed in FIG. 1c, the XRD pattern of N-GOQDD showed a strong peak centered at 20.3°, corresponding to a d-spacing of around 4.2 Å. A Fourier-transform infrared spectroscopy (FTIR) spectrum of N-GOQD in water is shown in FIG. 1d. Peaks at 1,709 and 1,790 $cm^{-1}$ for C=O stretch revealed the existence of carboxylic groups. Carboxylic groups bonded with aromatic rings have FTIR peaks in the range of 1700 to 1730 cm$^{-1}$, and are expected to shift to higher wave numbers by replacing carbon with nitrogen in the aromatic ring. Moreover, the FTIR spectrum indicated the existence of C—H groups (1395 cm$^{-1}$), N—H stretch of amine groups (1560 cm$^{-1}$), and C=C (1450 cm$^{-1}$) and C—N (1060 cm$^{-1}$) groups in N-GOQDs. The FTIR spectrum also shows two distinct peaks associated with oxygen functional groups at 1208 cm$^{-1}$ (C—O stretching vibrations of epoxy) and 1670 cm$^{-1}$ (C=N stretching vibrations of pyrrolic structure). The FTIR results therefore show agreement with the XPS spectrum measurements.

Example 5

Figure 2A:
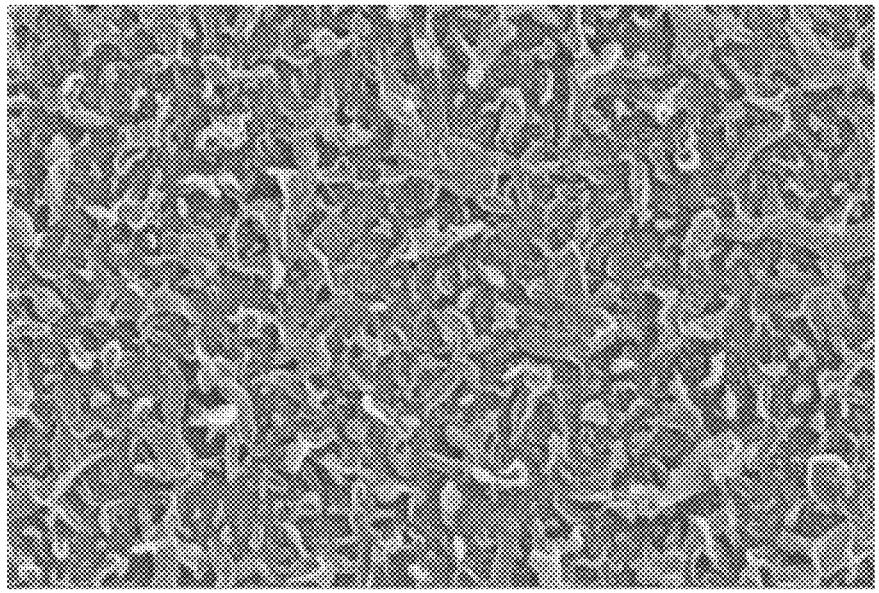
FIG. 2a depicts a field emission scanning electron microscope (FESEM) image of a polyamide (PA) membrane substrate.
Figure 2B:
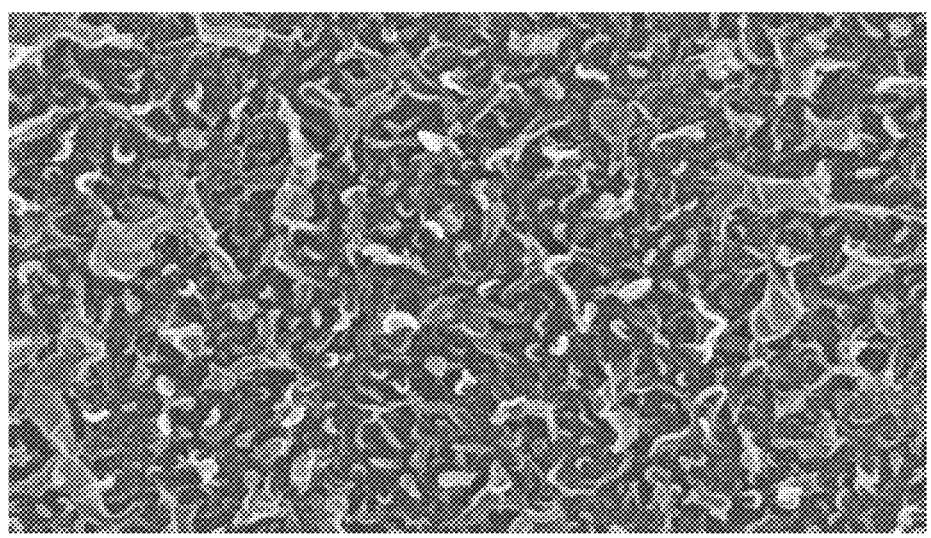
FIG. 2b depicts an FESEM image of the surface of a TFCM according to an embodiment of the present disclosure.
Figure 2C:
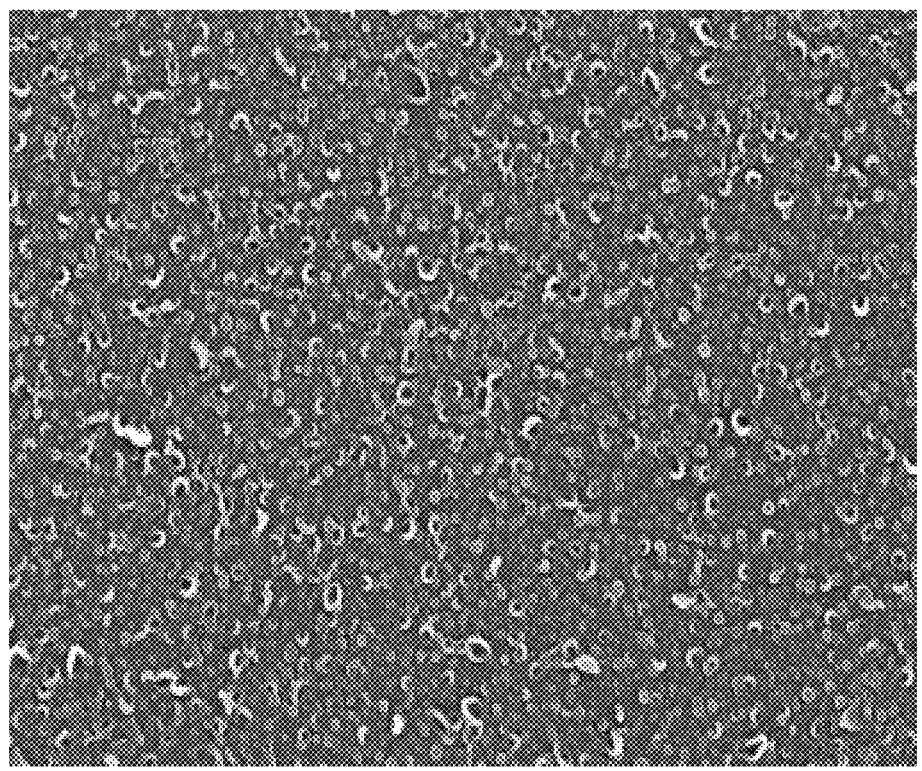
FIG. 2c depicts an FESEM image of the surface of a TFCM according to an embodiment of the present disclosure.
Figure 2D:
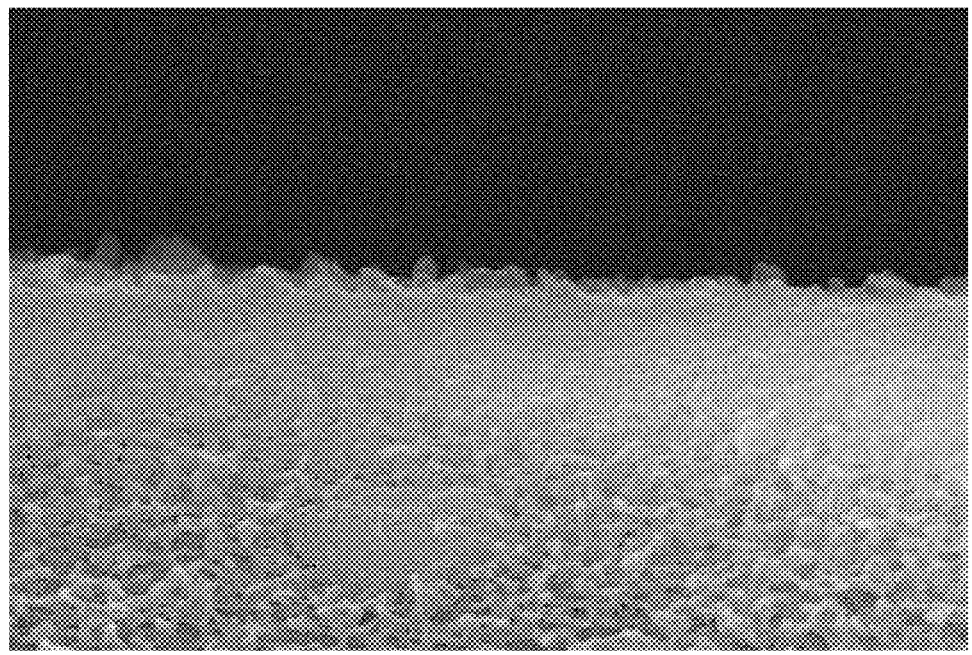
FIG. 2d depicts an FESEM image of a cross-section of a polyamide (PA) membrane substrate.
Figure 2E:
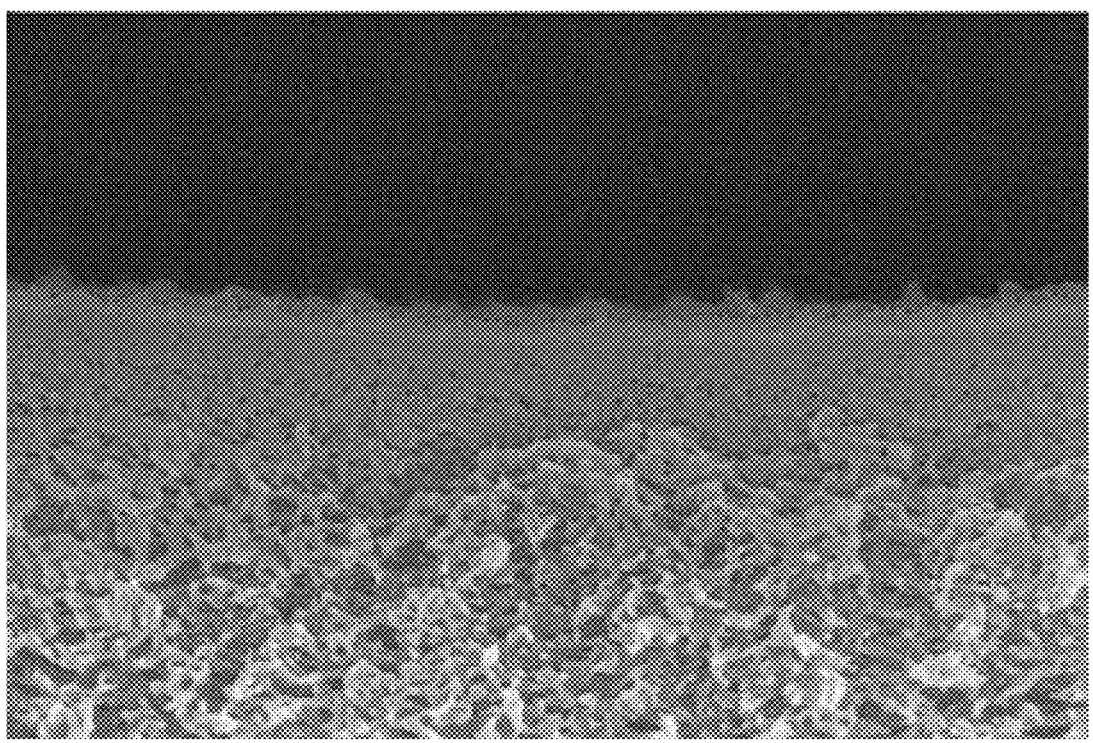
FIG. 2e depicts an FESEM image of a cross-section of a TFCM according to an embodiment of the present disclosure.
Figure 9:
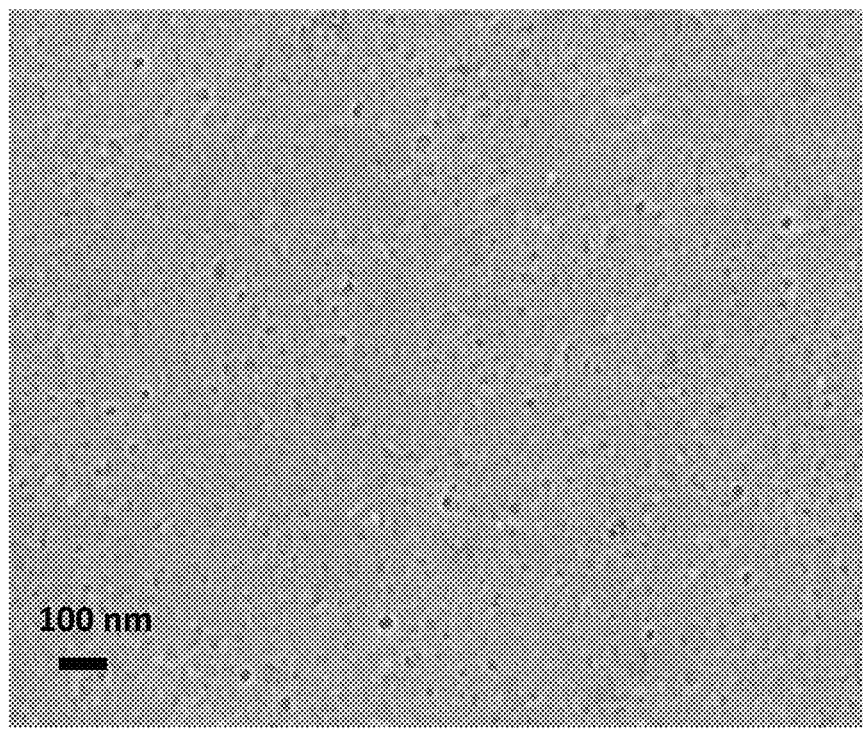
FIG. 9 depicts an FESEM image of a polysulfone support.

Thin-film nanocomposite membrane (TFCM) embodiments of the present disclosure were further characterized using FESEM, ATR, TGA, AFM, and contact angle measurements. FIGS. 2a through 2d show FESEM images of the surface and cross section of PA and PA TFN membranes. The PS support (FIG. 9) had pores between 10 nm and 30 nm, which makes it well suited as an RO membrane support. Surface images clearly indicate that adding N-GOQD nanoparticles changed the leaf-like morphology of the PA membrane to a hill and valley morphology of a PA TFN (or TFCM). Furthermore, a higher N-GOQD concentration led to a smoother surface as seen in FIGS. 2a through 2c. Adding different nanoparticles, such as zeolite, CNT, TiO$_2$, and SiO$_2$ into the IP reaction improved the release of heat of the reaction and thus improved surface roughness. The addition of N-GOQD also facilitated heat release during IP and thus led to a smoother surface. Cross-sectional views of PA and PA02 (FIGS. 2d and 2e) show an average skin layer thickness of around 250 nm in both samples, suggesting N-GOQD had negligible effect on membrane thickness.

Figure 10A:
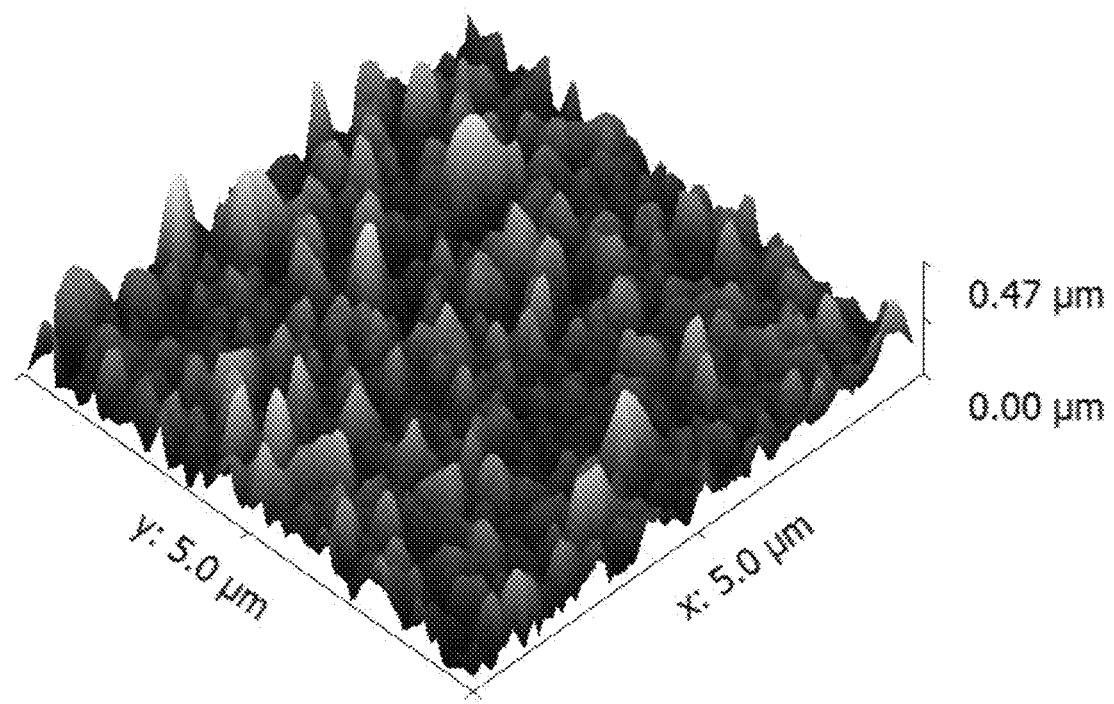
FIG. 10a depicts an atomic force microscopy (AFM) image of a polyamide membrane.
Figure 10B:
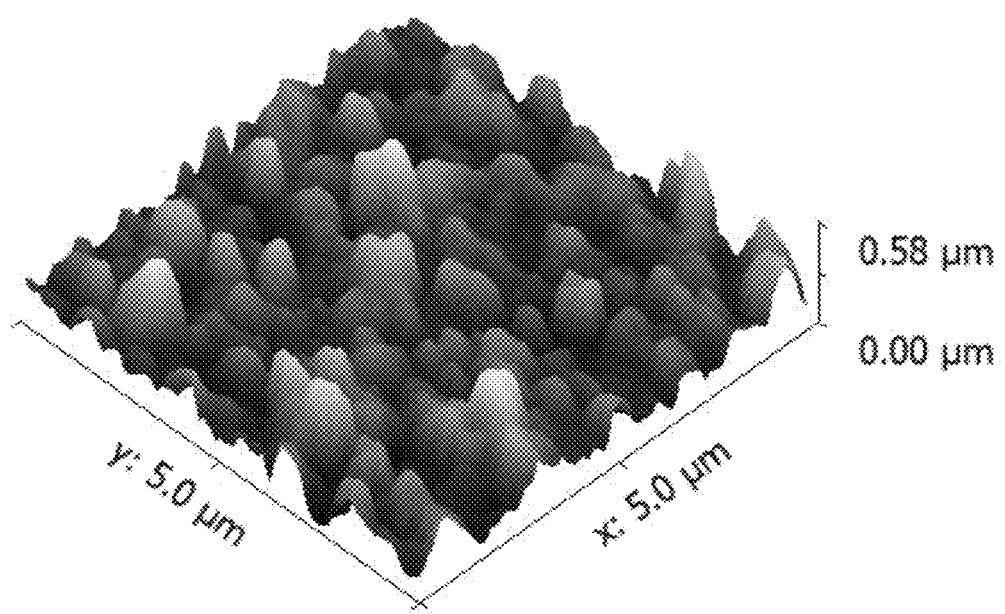
FIG. 10b depicts and AFM image of a TFCM according to an embodiment of the present disclosure (PA02).

To further characterize the surface properties of PA TFN membranes prepared using different N-GOQD concentrations, AFM and water contact angle (CA) measurements were conducted. N-GOQD nanoparticles have various functional groups, such as carboxylic, amine, etc. (FIGS. 1b and 1d), and thus are expected to participate in the IP reaction. With the increase of N-GOQD concentration in the precursor solution, surface roughness of PA TFN membranes first decreased and then increased slightly (Table 3); the minimum roughness was found in the PA02 membrane. As shown in FIGS. 10a and 10b, by adding 0.02 wt/v % N-GOQD in the IP reaction, membrane surface morphology changed from low-density large bumps to high-density small bumps, which leads to roughly a 150% increase in the effective surface area (Table 3). Adding more N-GOQD (PA07 and PA10), however, surprisingly resulted in significantly reduced effective area, which is comparable to that of PA. This may result from the aggregation of N-GOQD nanoparticles. However, it has been found that adding a high concentration of nanoparticles to the PA layer increased surface roughness because of nanoparticle agglomeration on membrane surface. Adding N-GOQD into the PA matrix also greatly improved its hydrophilicity, as shown in Table 3. The contact angle (CA) of water gradually decreased from 87° to <60° by adding up to 0.1% N-GOQD in the IP reaction. Enhanced effective surface area, combined with improved surface hydrophilicity, increases water absorption and thus increases water permeability. N-GOQDs on PA TFN membranes can therefore greatly increase water permeability.

TABLE 3

Surface roughness, effective surface area (over a scan area of 5 μm × 5 μm), and contact angle (CA) of PA and PA TFN membranes

| Sample | Ra (nm) | Rms (nm) | Effective surface area (μm$^2$) | CA (°) |
|---|---|---|---|---|
| PA | 78 ± 5 | 97.3 ± 3 | 41.2 | 87 ± 2 |
| PA0025 | 78.3 ± 2 | 96.9 ± 3 | 46.1 | 86 ± 1 |
| PA005 | 77.3 ± 4 | 95.9 ± 3 | 47.1 | 82 ± 3 |
| PA01 | 72 ± 2 | 91.8 ± 3 | 67.3 | 73 ± 2 |
| PA02 | 51.9 ± 3 | 66.4 ± 3 | 63.5 | 57 ± 4 |
| PA04 | 55.9 ± 4 | 71.4 ± 3 | 61.3 | 58 ± 3 |
| PA07 | 56.2 ± 4 | 76.3 ± 4 | 44.7 | 56 ± 2 |
| PA10 | 54.7 ± 6 | 73.9 ± 5 | 38.9 | 56 ± 2 |

Figure 3:
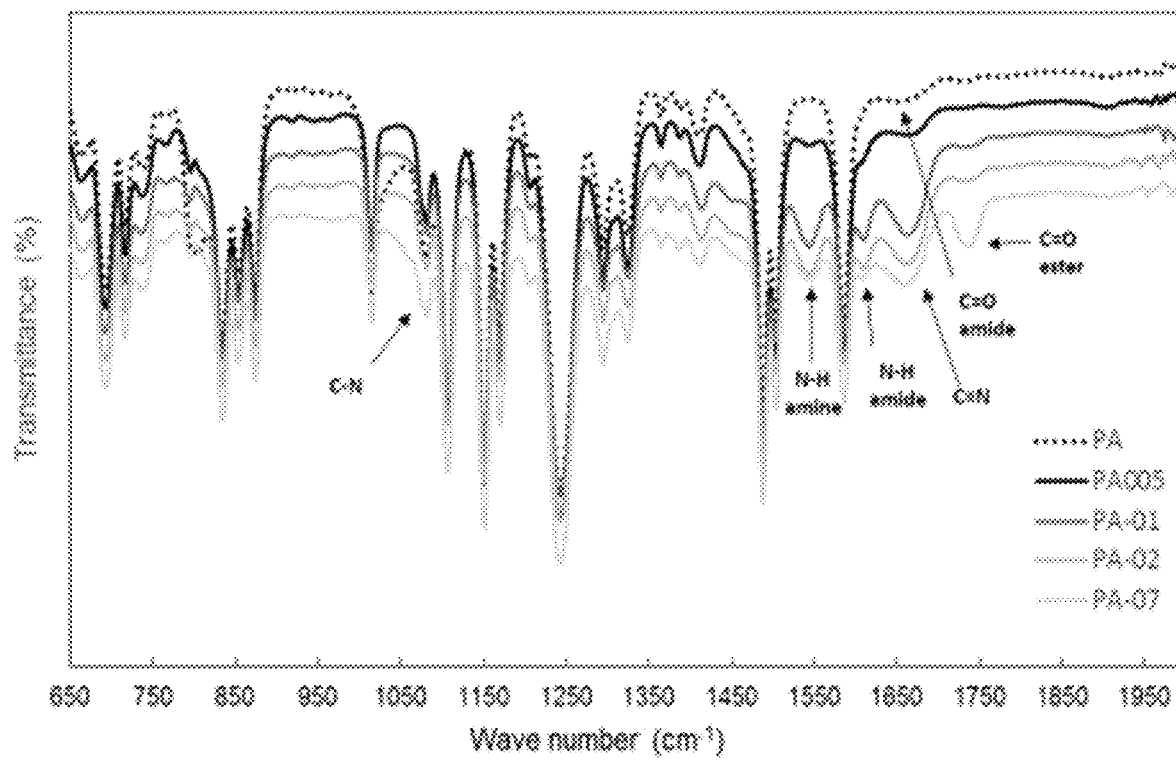
FIG. 3 depicts an attenuated total reflection (ATR) Fourier Transform Infrared (FTIR) measurements graph of a TFCM according to an embodiment of the present disclosure.

The ATR-FTIR spectra of PA and PA TFN membranes are presented in FIG. 3. The peaks at 1,488 and 1,245 cm$^{-1}$ correspond to CH$_3$—C—CH$_3$ stretching and C—O—C stretching of the PS support. Absorption bands at 1,600-1, 700 and 1,700-1,760 cm$^{-1}$ are likely due to the C=O bonds of polyamide and ester groups, respectively. The amide bonds of the fabricated PA active layer appear at around 1,660, 1,640 and 1,080 cm$^{-1}$ for C=O stretching of carboxylic, N—H stretching of amide, and C—N stretching, respectively. A PA layer with N-GOQD nanoparticles shows a very wide peak from 1,600 to 1,720 cm$^{-1}$, which can be deconvoluted into three peaks, 1,624 cm$^{-1}$ (N—H of amide), around 1,650 cm$^{-1}$ (C=O of carboxylic), and 1,670 cm$^{-1}$ (C=N of pyrrolic). The ATR-FTIR spectrum of pristine PA did not show the presence of amine N—H groups at wavenumber of 1,560 cm$^{-1}$, while this peak can be clearly seen in the N-GOQD/PA composite membrane.

The intensity of the amine N—H peak increased with the increase of the N-GOQD concentration until 0.02 wt/v %, and then significantly decreased. This suggests that amine groups of N-GOQD significantly contribute in IP, instead of MPD monomers. Moreover, the intensity of the ester C=O of carboxylic groups (1,740 cm$^{-1}$) increased with N-GOQD concentration, suggesting that high concentrations of N-GOQD may impede the reaction between MPD and TMC monomers and thus lower the degree of PA crosslinking.

Figure 4:
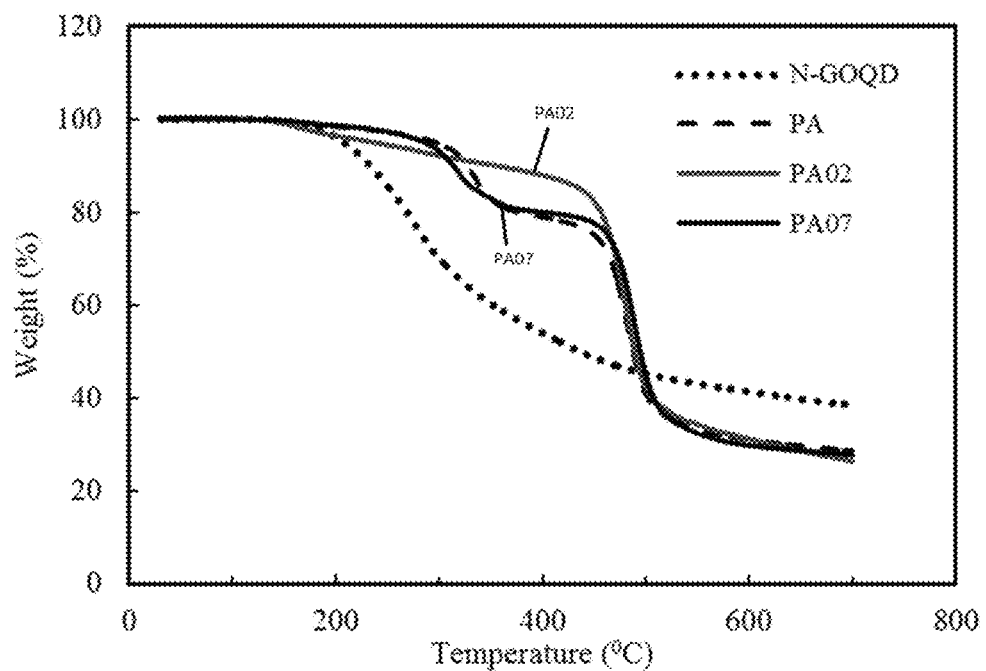
FIG. 4 depicts Thermal Gravimetric Analysis (TGA) measurements of substrates and embodiments of the present disclosure.

Thermal gravimetric analysis (TGA) measurements were conducted to understand the effect of N-GOQD on the thermal stability of PA TFN, as shown in FIG. 4. Two weight loss zones were seen for PA at temperatures starting at around 280 and 450° C., which can be assigned to degradation of unreacted functional groups, such as amine and acid groups, and decomposition of PA polymer.

The TGA curve of N-GOQD revealed that the decomposition of N-GOQD started at about 180° C. and had a relatively low and gradually decreasing rate over a wide temperature range up to 700° C. The functional groups of N-GOQD, such as amine and hydroxyl groups, are more heat sensitive than those of PA, and thus they can be more easily removed from the N-GOQD surface. Decomposition of PA02 started at roughly the same temperature as that of N-GOQD, and only one major mass loss can be seen starting from 440° C., following a similar trend as the second major mass loss of PA. Adding N-GOQD significantly improved the thermal stability of the PA TFN. This is likely a result of the participation of N-GOQD in the polymerization process, which leads to better cross-linked PA matrix and less residual and unreacted functional groups. However, PA07 with higher N-GOQD loading showed a slightly higher decomposition rate than that of PA during the first major mass loss and almost the same rate during the second major mass loss. This suggests that adding too much N-GOQD might decrease the degree of PA crosslinking, which is consistent with the ATR-FTIR results of FIG. 3.

Example 6

Desalination performance of PA TFN membranes of the present disclosure were evaluated and compared with plain PA membranes, as shown in FIG. 5. Water permeability of PA TFN membranes increased almost linearly from 0.62 to 1.66 L/($m^2 \cdot h \cdot bar$) with the increase of N-GOQD concentration from 0 to 0.02 wt/v % without sacrificing salt rejection (~93%). Further increasing N-GOQD concentration to 0.04 wt/v % had negligible effect on water permeability and salt rejection. Water permeability, however, decreased almost linearly from 1.72 to 0.55 L/($m^2 \cdot h \cdot bar$) with the increase of N-GOQD concentration from 0.04 to 0.1 wt/v %, whereas salt rejection decreased to 85% and 50% for 0.07 and 0.1 wt/v % N-GOQD, respectively.

Favourable membrane surface properties, including high effective membrane area and excellent hydrophilicity, can increase water permeability during desalination. Water permeability of PA membranes can increase fourfold with an increase of the effective area by 80%. Improved hydrophilicity can also increase water absorption and thus increase water permeability. N-GOQDs react with MPD and TMC monomers, as shown in FIG. 3, and crosslinking between N-GOQD and PA can create transport pathways with larger pores at the interface than those of the PA matrix, due to the relatively sparse distribution of functional groups on N-GOQD. These larger pores are expected to facilitate water transport but may have lower salt rejection. Therefore, when N-GOQD loading in the PA matrix is relatively low, the existence of these larger interfacial pores may be beneficial for increasing water permeability. Considering both favourable surface properties (Table 3) and a small amount of larger interfacial pores for PA0025 to PA04, water permeability increases while high salt rejection is maintained. For PA07 and PA10 with high N-GOQD loading, the effective surface area decreased significantly (Table 3) and became comparable to that of PA, whereas the water contact angle (CA) was almost the same as that of PA04. Reduced effective surface area appeared to significantly reduce water permeability.

Moreover, with high loading of N-GOQD in PA, the PA may crosslink with itself and agglomerate in the PA matrix, leading to local water blockage. Attenuated total reflection (ATR) results (FIG. 3) also confirmed that high N-GOQD concentrations caused a change of polymer structure from polyamide to polyester, which can significantly decrease water flux and salt rejection. It was found that changing the thin film structure of the RO membrane from polyamide to polyester decreases water permeability and reduces salt rejection from 95% to less than 60%. As the result of all these factors, PA TFN membranes (PA07 and PA10) with high N-GOQD loading exhibited both low water permeability and low salt rejection.

N-GOQD, therefore, has been shown to be an effective additive for PA membranes to greatly improve its surface hydrophilicity and effective surface area, while introducing sparse large interfacial pores to facilitate water transport. Therefore, optimizing N-GOQD loading in a PA matrix significantly increased water permeability without sacrificing salt rejection.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A thin film composite membrane (TFCM) comprising a substrate membrane having nitrogen-doped graphene oxide quantum dots (N-GOQDs), wherein the nitrogen-doped graphene oxide quantum dots are synthesized by carbonization of citric acid with ammonia through hydrothermal treatment and have a diameter ranging from about 3 nanometers to about 30 nanometers, and wherein the TFCM further comprises a membrane support, further wherein the N-GOQDs are applied to the TFCM in an aqueous solution, wherein the N-GOQDs are present in the aqueous solution in an amount ranging from greater than 0 wt./v. % to about 0.04 wt./v. %.

2. The TFCM of claim 1, wherein the membrane support includes polysulfone.

3. The TFCM of claim 1, wherein the TFCM includes graphene oxide quantum dots (GOQDs).

4. The TFCM of claim 1, wherein the substrate membrane includes a polyamide.

5. The TFCM of claim 1, wherein the TFCM further comprises zeolite particles.

6. The TFCM of claim 1, wherein the TFCM further comprises titanium oxide particles.

7. The TFCM of claim 1, wherein the TFCM further comprises sulfur oxide particles.

8. The TFCM of claim 1, wherein the TFCM further comprises carbon nanotubes.

9. The TFCM of claim 1, wherein the TFCM further comprises graphene oxide (GO) flakes.

10. The TFCM of claim 1, wherein the TFCM further comprises reduced graphene oxide (rGO).

11. The TFCM of claim 3, wherein the GOQDs have a diameter ranging from about 3 nm to about 20 nm.

12. The TFCM of claim 1, wherein the N-GOQDs have a nitrogen to carbon (N/C) atomic ratio of from about 0.2 to about 0.6 as measured by X-ray photoelectron spectroscopy (XPS).

13. The TFCM of claim 1, wherein the N-GOQDs have an oxygen to carbon (O/C) atomic ratio of from about 0.7 to about 1.1 as measured by X-ray photoelectron spectroscopy (XPS).

14. The TFCM of claim 1, wherein the TFCM has a thickness of from about 100 nm to about 400 nm and an Rms surface roughness of from about 60 nm to about 110 nm.

* * * * *